(12) United States Patent
VanBlon et al.

(10) Patent No.: US 10,909,507 B1
(45) Date of Patent: Feb. 2, 2021

(54) APPARATUS, METHOD, AND PROGRAM PRODUCT FOR DIGITAL ASSISTANT MANAGEMENT

(71) Applicant: LENOVO (Singapore) PTE. LTD., New Tech Park (SG)

(72) Inventors: Russell Speight VanBlon, Raleigh, NC (US); Kevin Wayne Beck, Raleigh, NC (US); Roderick Echols, Chapel Hill, NC (US); Ryan Charles Knudson, Tampa, FL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/691,131

(22) Filed: Nov. 21, 2019

(51) Int. Cl.
| | | |
|---|---|---|
| *G06Q 10/10* | (2012.01) | |
| *G06F 9/451* | (2018.01) | |
| *G10L 25/78* | (2013.01) | |
| *G06F 3/16* | (2006.01) | |
| *G06Q 30/02* | (2012.01) | |

(52) U.S. Cl.
CPC ......... *G06Q 10/1095* (2013.01); *G06F 3/167* (2013.01); *G06F 9/453* (2018.02); *G10L 25/78* (2013.01); *G06Q 30/02* (2013.01); *G06Q 30/0241* (2013.01)

(58) Field of Classification Search
None
See application file for complete search history.

(56) References Cited

U.S. PATENT DOCUMENTS

| | | | | |
|---|---|---|---|---|
| 7,881,699 | B2* | 2/2011 | Jones | H04L 63/0892 455/411 |
| 2013/0065520 | A1* | 3/2013 | Skutnick | H04W 4/023 455/41.1 |
| 2014/0283138 | A1* | 9/2014 | Hochberg | H04L 63/08 726/30 |
| 2014/0337607 | A1* | 11/2014 | Peterson | H04W 4/50 713/1 |

(Continued)

FOREIGN PATENT DOCUMENTS

| | | | | |
|---|---|---|---|---|
| WO | WO-2013163326 | A1 * | 10/2013 | G07G 5/00 |
| WO | WO-2016040089 | A1 * | 3/2016 | G06F 3/167 |

OTHER PUBLICATIONS

Patrick, Shawn. Twelve Years Later, "Minority Report" Advertising Is Here. Published at Vox.com on Apr. 28, 2014, retrieved from [ https://www.vox.com/2014/4/28/12099140/twelve-years-later-minority-report-advertising-is-here] on Jun. 7, 2020. (Year: 2014).*

(Continued)

*Primary Examiner* — Amy M Levy
(74) *Attorney, Agent, or Firm* — Kunzler Bean & Adamson

(57) ABSTRACT

Apparatuses, methods, and program products are disclosed for digital assistant management. One apparatus includes a processor and a memory that stores code executable by the processor. The code is executable by the processor to receive, by use of the processor, information indicating digital assistant user preferences for a user in response to the user being within a predetermined distance from the apparatus. The code is executable by the processor to configure the apparatus based on the information. The code is executable by the processor to provide feedback to the user based on the information.

16 Claims, 6 Drawing Sheets

(56) References Cited

U.S. PATENT DOCUMENTS

2018/0032997 A1* 2/2018 Gordon .............. G06Q 30/0269
2019/0180742 A1* 6/2019 Kothari ................ H04W 12/06

OTHER PUBLICATIONS

Elgan, Mike. When every public screen is your personal screen. Published at ComputerWorld on Apr. 14, 2018, retrieved from [https://www.computerworld.com/article/3268845/when-every-public-screen-is-your-personal-screen.html] on Jun. 7, 2020. (Year: 2018).*

* cited by examiner

APPARATUS, METHOD, AND PROGRAM PRODUCT FOR DIGITAL ASSISTANT MANAGEMENT

FIELD

The subject matter disclosed herein relates to electronic calendars and more particularly relates to digital assistant management.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for performing various actions. Certain information handling devices may be used as digital assistants. Digital assistants may be publicly available to a large number of users.

BRIEF SUMMARY

An apparatus for digital assistant management is disclosed. A method and computer program product also perform the functions of the apparatus. In one embodiment, the apparatus includes a processor and a memory that stores code executable by the processor. The code, in various embodiments, is executable by the processor to receive, by use of the processor, information indicating digital assistant user preferences for a user in response to the user being within a predetermined distance from the apparatus. The code, in certain embodiments, is executable by the processor to configure the apparatus based on the information. The code, in some embodiments, is executable by the processor to provide feedback to the user based on the information.

In some embodiments, the code is executable by the processor to receive the information directly from a device carried by the user via a wireless signal. In one embodiment, the code is executable by the processor to receive the information from a server in response to the server: receiving the information; and determining that the user is within a predetermined distance from the apparatus. In various embodiments, the digital assistant user preferences include a public profile for the user. In some embodiments, the public profile includes a name the apparatus uses to communicate with the user, a preferred voice gender, voice detection information used to detect whether the user is speaking, music preferences of the user, news preferences of the user, shopping preferences of the user, food preferences of the user, entertainment preferences of the user, and/or sports preferences of the user.

A method for digital assistant management, in one embodiment, includes receiving, by a digital assistant, information indicating digital assistant user preferences for a user in response to the user being within a predetermined distance from the digital assistant. In certain embodiments, the method includes configuring the digital assistant based on the information. In some embodiments, the method includes providing feedback to the user based on the information.

In some embodiments, receiving the information includes receiving the information directly from a device carried by the user via a wireless signal. In various embodiments, receiving the information includes receiving the information from a server in response to the server: receiving the information; and determining that the user is within a predetermined distance from the digital assistant. In one embodiment, the digital assistant user preferences include a public profile for the user. In some embodiments, the public profile includes a name the digital assistant uses to communicate with the user, a preferred voice gender, voice detection information used to detect whether the user is speaking, music preferences of the user, news preferences of the user, shopping preferences of the user, food preferences of the user, entertainment preferences of the user, and/or sports preferences of the user. In certain embodiments, the method includes removing the information from the digital assistant in response to the user not being within the predetermined distance from the digital assistant.

In some embodiments, the method includes removing the information from the digital assistant after a predetermined period of time elapses. In various embodiments, providing the feedback to the user includes providing audio feedback to the user. In certain embodiments, providing the feedback to the user includes providing video feedback to the user. In some embodiments, the method includes receiving audible input from the user. In various embodiments, providing the feedback to the user includes providing the feedback to the user based on the audible input received from the user.

In one embodiment, a program product includes a computer readable storage medium that stores code executable by a processor. The executable code, in certain embodiments, includes code to perform receiving, by use the processor, information indicating digital assistant user preferences for a user in response to the user being within a predetermined distance from a digital assistant comprising the program product. The executable code, in various embodiments, includes code to perform configuring the digital assistant based on the information. The executable code, in some embodiments, includes code to perform providing feedback to the user based on the information.

In certain embodiments, the executable code includes code to perform removing the information from the digital assistant in response to the user not being within the predetermined distance from the digital assistant. In one embodiment, the executable code includes code to perform removing the information from the digital assistant after a predetermined period of time elapses. In certain embodiments, providing the feedback to the user includes providing audio feedback to the user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
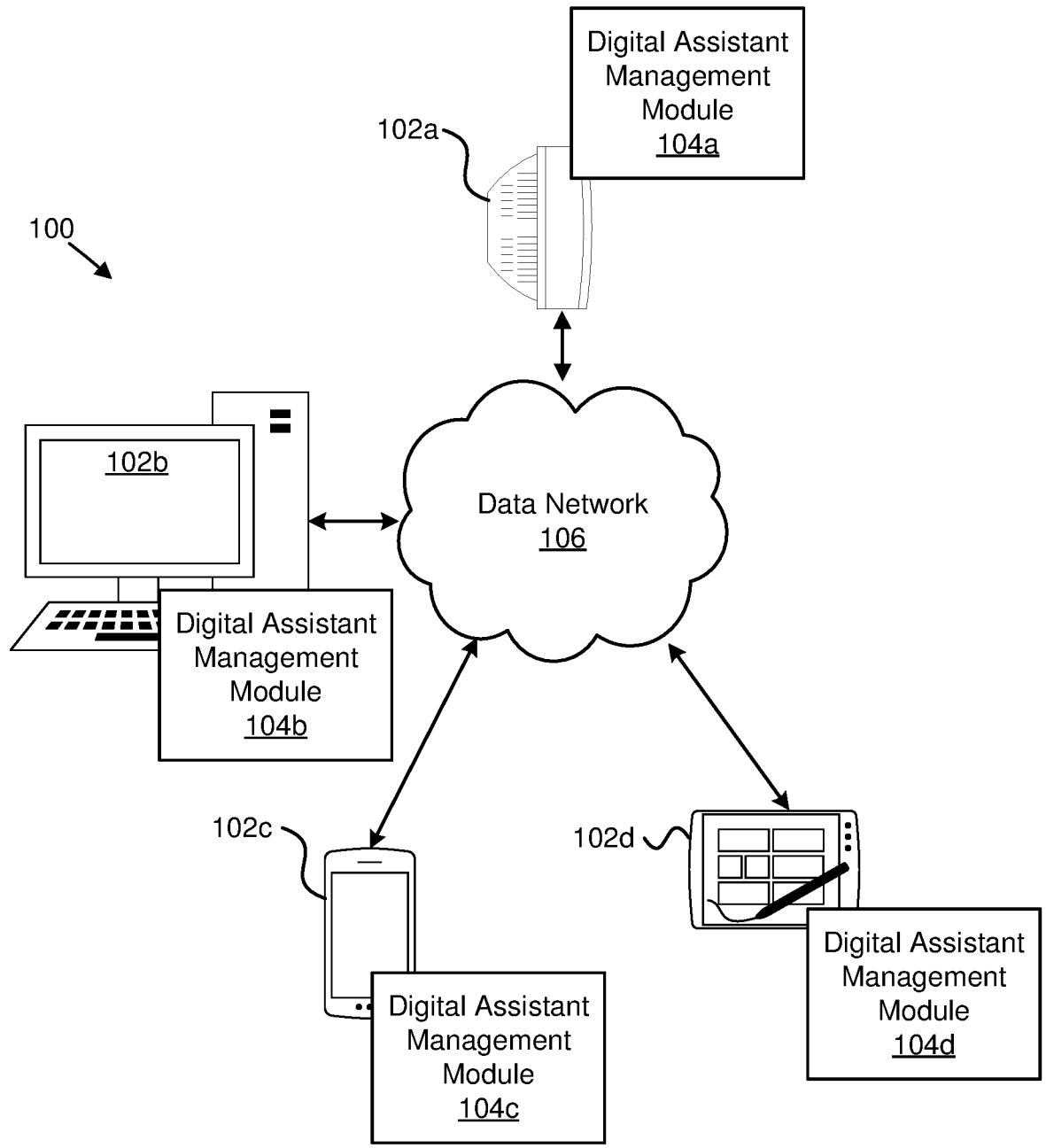
FIG. 1 is a schematic block diagram illustrating one embodiment of a system for digital assistant management.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for digital assistant management. In one embodiment, the system 100 includes information handling devices 102 (e.g., 102a, 102b, 102c, 102d), digital assistant management modules 104 (e.g., 104a, 104b, 104c, 104d), and data networks 106. Even though a specific number of information handling devices 102, digital assistant management modules 104, and data networks 106 are depicted in FIG. 1, one of skill in the art will recognize that any number of information handling devices 102, digital assistant management modules 104, and data networks 106 may be included in the system 100.

In one embodiment, the information handling devices 102 include computing devices, such as desktop computers, laptop computers, personal digital assistants (PDAs), tablet computers, smart phones, cellular phones, smart televisions (e.g., televisions connected to the Internet), set-top boxes, game consoles, security systems (including security cameras), vehicle on-board computers, network devices (e.g., routers, switches, modems), streaming devices, digital assistants (e.g., public digital assistants), or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the digital assistant management module 104. In certain embodiments, the digital assistant management module 104 may receive, by use of a digital assistant, information indicating digital assistant user preferences for a user in response to the user being within a predetermined distance from the digital assistant. The digital assistant management module 104 may also configure the digital assistant based on the information. The digital assistant management module 104 may provide feedback to the user based on the information. In this manner, the digital assistant management module 104 may be used for digital assistant management.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
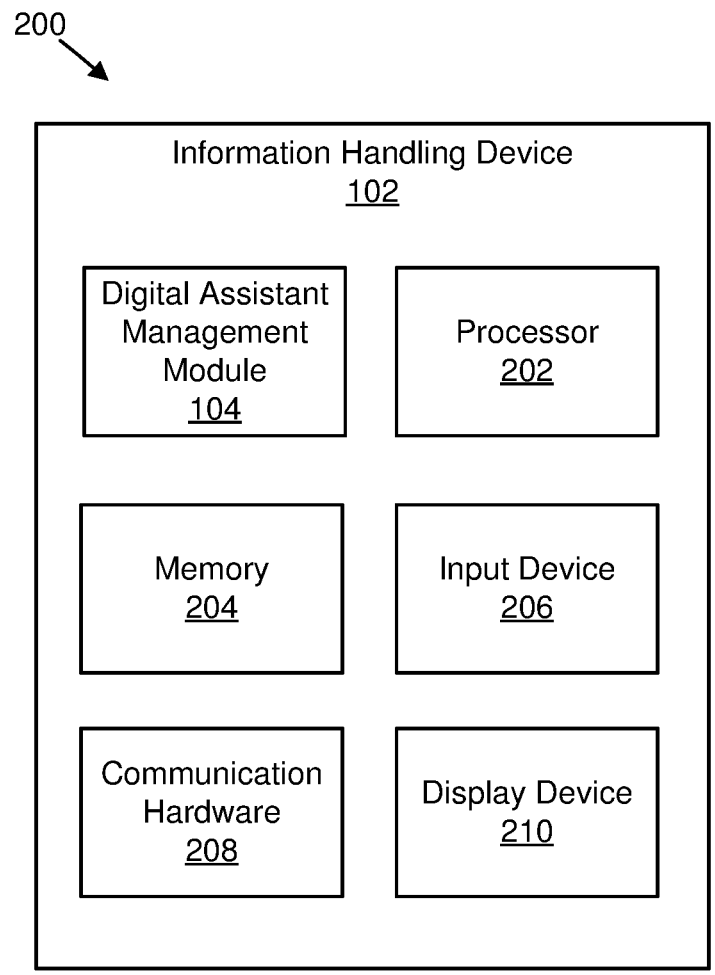
FIG. 2 is a schematic block diagram illustrating one embodiment of an apparatus including an information handling device.

FIG. 2 depicts one embodiment of an apparatus 200 that may be used for digital assistant management. The apparatus 200 includes one embodiment of the information handling device 102. Furthermore, the information handling device 102 may include the digital assistant management module 104, a processor 202, a memory 204, an input device 206, communication hardware 208, and optionally a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the digital assistant management module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores configuration information. In some embodiments, the memory 204 also stores program code and related data, such as an operating system or other controller algorithms operating on the information handling device 102.

The information handling device 102 may use the digital assistant management module 104 for digital assistant management. As may be appreciated, the digital assistant management module 104 may include computer hardware, computer software, or a combination of both computer hardware and computer software. For example, the digital assistant management module 104 may include circuitry, or the processor 202, used to receive, by use of the processor 202, information indicating digital assistant user preferences for a user in response to the user being within a predetermined distance from the information handling device 102. As another example, the digital assistant management module 104 may include computer program code that configures the information handling device 102 based on the information. As a further example, the digital assistant management module 104 may include computer program code that provides feedback to the user based on the information.

The input device 206, in one embodiment, may include any known computer input device including a touch panel, a button, a keyboard, a stylus, a microphone for receiving audio input (e.g., or another audio input device for receiving audio input), or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the digital assistant management module 104.

In some embodiments, a user may want to communicate with a publicly available digital assistant that is configured to the user's preferences. Described herein are various embodiments that use a digital assistant management module 104 to configure an apparatus (e.g., public digital assistant) to the user's preferences.

Figure 3:
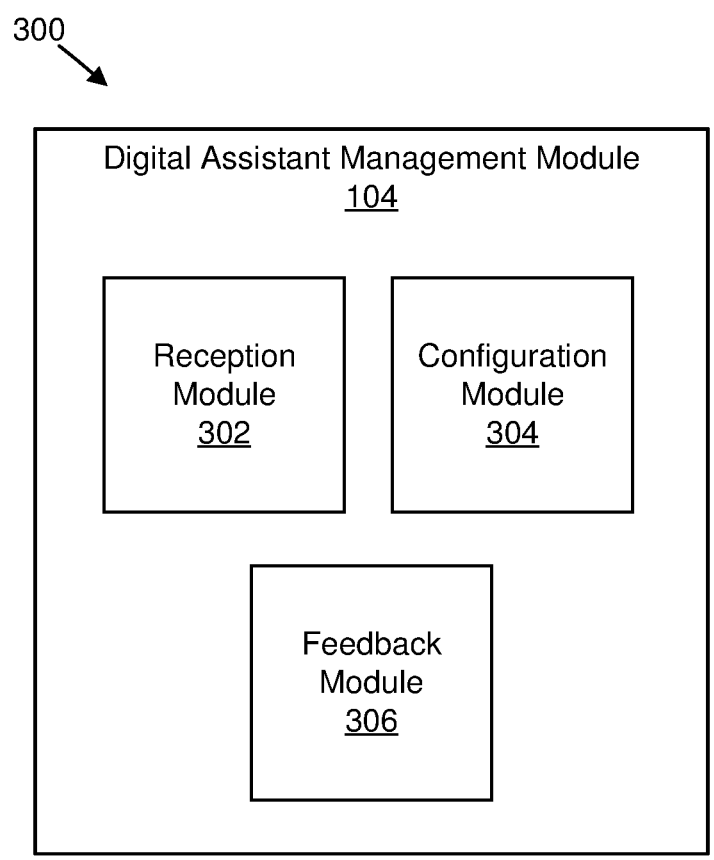
FIG. 3 is a schematic block diagram illustrating one embodiment of an apparatus including a digital assistant management module.

FIG. 3 depicts a schematic block diagram illustrating one embodiment of an apparatus 300 (e.g., digital assistant, information handling device 102) that includes one embodiment of the digital assistant management module 104. Furthermore, the digital assistant management module 104 includes a reception module 302, a configuration module 304, and a feedback module 306.

In certain embodiments, the reception module 302 may receive (e.g., by use of the processor 202, by use of a digital assistant) information indicating digital assistant user preferences for a user in response to the user being within a predetermined distance from the apparatus 300. The information may be received in one or more encrypted messages. The digital assistant user preferences may include a public profile for the user (e.g., a profile that does not include any confidential personal information, a profile that does not include access to user accounts and/or passwords of the user, a profile that is publicly available). For example, the public profile may include a name the digital assistant uses to communicate with the user, a preferred voice gender of the user, voice detection information used to detect whether the user is speaking, music preferences of the user, news preferences of the user, shopping preferences of the user, food preferences of the user, entertainment preferences of the user, travel preferences of the user, language preferences of the user, and/or sports preferences of the user. Any anonymous preferences of the user may be part of the public profile. As may be appreciated, the various preferences of the user may include likes and/or dislikes of the user. In one example, the public profile includes a stop used by a user that gets on a bus. In another example, the public profile includes a dietary preference (e.g., allergies, dairy preference, gluten preference, meat preference, etc.) of a user entering a restaurant. In a further example, the public profile may include historical information about habits and/or interactions of the user, such as the user requesting news information at a certain time of a day.

The user may be any person that is able to be within the predetermined distance from the apparatus 300. The information may include location data (e.g., global positioning system data, map data, proximity data, relative location data) that indicates a current location of the apparatus 300 and/or receiving the information may itself indicate that the user is within the predetermined distance from the apparatus 300 (e.g., within transmission range, within Bluetooth® transmission range).

The predetermined distance from the apparatus 300 may be a distance from the apparatus 300 for which the apparatus 300 is able to receive voice commands from the user and/or provide feedback to the user. For example, the predetermined distance may be approximately 5 feet, 10 feet, 20 feet, 60 feet, or more.

In some embodiments, receiving the information includes receiving the information directly from a device carried by the user via a wireless signal. For example, the device carried by the user may be a cell phone, a fitness tracking device, or so forth. In such embodiments, the device may transmit the information at predetermined time intervals and/or upon detection of the apparatus 300. The ability to transmit the information and/or the circumstances that enable transmission of the information may be selected and/or configured by the user.

In various embodiments, receiving the information includes receiving the information from a server in response to the server: receiving the information; and determining that the user is within a predetermined distance from the apparatus 300. In such embodiments, a device carried by the user may transmit the information to the server and/or transmit location information of the device to the server. For example, the device carried by the user may be a cell phone, a fitness tracking device, or so forth. In such embodiments, the device may transmit the information at predetermined time intervals and/or upon the device detecting the apparatus 300. The ability to transmit the information and/or the circumstances that enable transmission of the information may be selected and/or configured by the user. The server may receive the information from the device and determine how far the user is from the apparatus 300, then, upon determining that the user is within the predetermined distance from the apparatus 300, transmit the information to the apparatus 300.

In one embodiment, the configuration module 304 may configure the apparatus 300 based on the information. In certain embodiments, the apparatus 300 may be configured with information from multiple users concurrently. The apparatus 300 may select which user information to apply to audio input received based on one or more factors, such as selecting the most recent user information received, selecting the user information that indicates the user having a location closest to the apparatus 300, and/or selecting the user information that matches voice characteristics of the audio input received. In some embodiments, the apparatus 300 may apply multiple user information configurations concurrently for concurrently communicating (e.g., sending and/or receiving information) with multiple users.

In various embodiments, the feedback module 306 may provide feedback to the user based on the information. In certain embodiments, providing the feedback to the user includes providing audio feedback to the user. In some embodiments, providing the feedback to the user includes providing video feedback to the user. The feedback provided to the user may include responding to a user's question, providing advertisements to the user, providing directions to the user, and so forth. In various embodiments, the audio and/or video feedback may be provided directly from the apparatus 300 via a speaker and or display of the apparatus 300. In certain embodiments, the audio and/or video feedback may be provided to a device of the user. For example, a speaker of the device of the user may be used to provide personalized feedback to the user. As another example, textual and/or graphical information may be provided on the device of the user.

In one embodiment, the digital assistant management module 104 may receive audible input from the user. In such an embodiment, the feedback module 306 providing the feedback to the user may include the feedback module 306 providing the feedback to the user based on the audible input received from the user. In various embodiments, the digital assistant management module 104 may remove the information from the apparatus 300 in response to the user not being within the predetermined distance from the apparatus 300. The apparatus 300 may determine that the user is not within the predetermined distance from the apparatus 300 based on information received from a device carried by the user and/or by not receiving updated information from the device for a predetermined period of time (e.g., 1 minute, 2 minutes, 5 minutes, etc.). In certain embodiments, the digital assistant management module 104 may remove the information from the apparatus 300 after a predetermined period of time elapses since the apparatus 300 received the information (e.g., 8 minutes, 10 minutes, 30 minutes, etc.).

Figure 4:
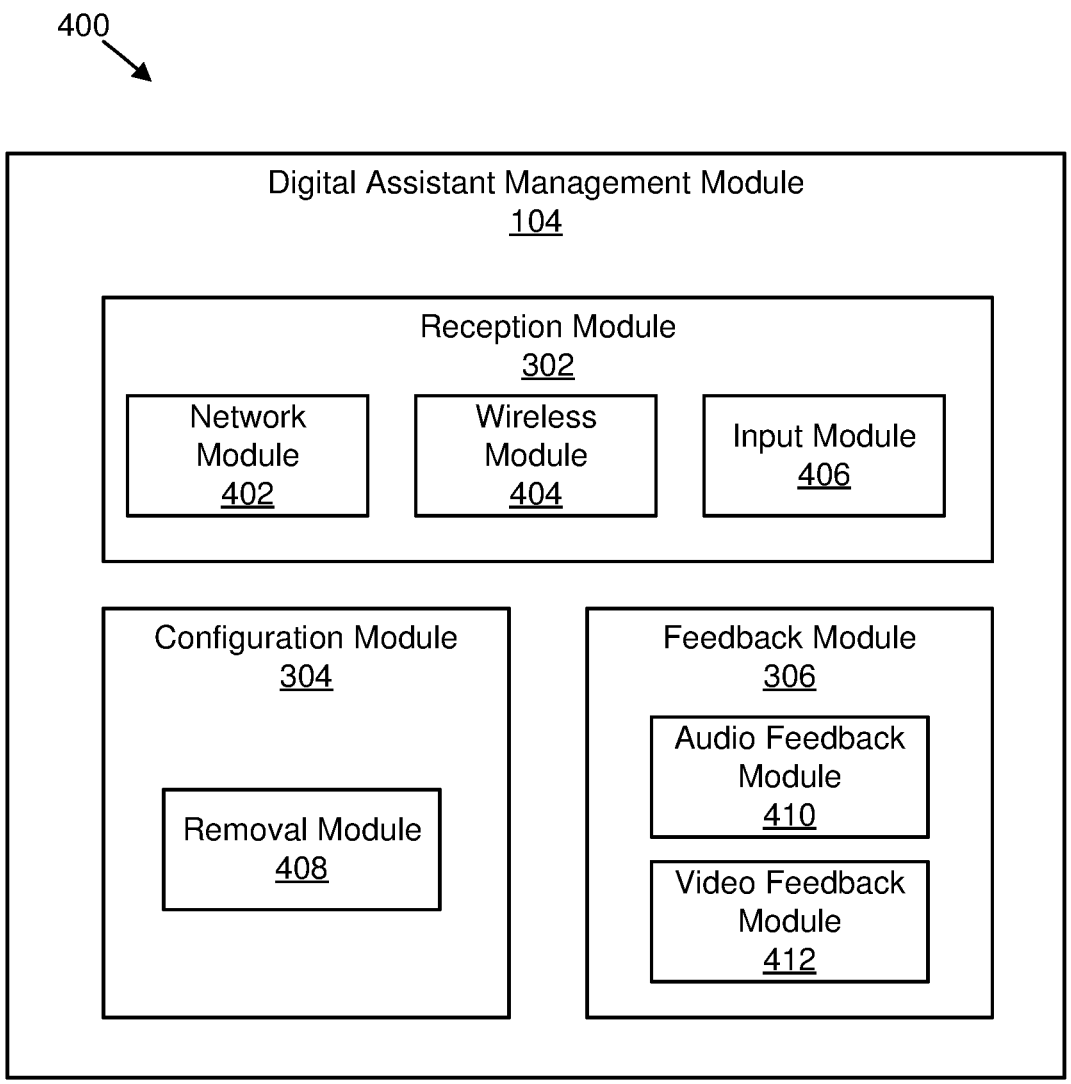
FIG. 4 is a schematic block diagram illustrating another embodiment of an apparatus including a digital assistant management module.

FIG. 4 is a schematic block diagram illustrating another embodiment of an apparatus 400 that includes one embodiment of the digital assistant management module 104. Furthermore, the digital assistant management module 104 includes one embodiment of the reception module 302, the configuration module 304, and the feedback module 306, that may be substantially similar to the reception module 302, the configuration module 304, and the feedback module 306 described in relation to FIG. 3. The reception module 304 includes a network module 402, a wireless module 404, and an input module 406. The configuration module 304 includes a removal module 408. The feedback module 306 includes an audio feedback module 410 and a video feedback module 412.

The network module 402 may receive the information from a server in response to the server: receiving the information; and determining that the user is within a predetermined distance from the apparatus 400. In such embodiments, a device carried by the user may transmit the information to the server and/or transmit location information of the device to the server. For example, the device carried by the user may be a cell phone, a fitness tracking device, or so forth. In such embodiments, the device may transmit the information at predetermined time intervals and/or upon detection of the apparatus 400. The ability to transmit the information and/or the circumstances that enable transmission of the information may be selected and/or configured by the user. The server may receive the information from the device and determine how far the user is from the apparatus 400, then, upon determining that the user is within the predetermined distance from the apparatus 400, transmit the information to the apparatus 400.

The wireless module 404 may receive the information directly from a device carried by the user via a wireless signal. For example, the device carried by the user may be a cell phone, a fitness tracking device, or so forth. In such embodiments, the device may transmit the information at predetermined time intervals and/or upon the device detecting the apparatus 400. The ability to transmit the information and/or the circumstances that enable transmission of the information may be selected and/or configured by the user.

The input module 406 may receive audible input or other input from the user. As may be appreciated, feedback may be provided to the user based on the audible input received from the user.

The removal module 408 may remove the information from the apparatus 400 in response to the user not being within the predetermined distance from the apparatus 400. The apparatus 400 may determine that the user is not within the predetermined distance from the apparatus 400 based on information received from a device carried by the user and/or by not receiving updated information from the device for a predetermined period of time (e.g., 1 minute, 2 minutes, 5 minutes, etc.). In certain embodiments, the removal module 408 may remove the information from the apparatus 400 after a predetermined period of time elapses since the apparatus 400 received the information (e.g., 8 minutes, 10 minutes, 30 minutes, etc.).

The audio feedback module 410 may provide audio feedback to the user (e.g., advertisements, voice information, voice responses, etc.) based on the information. The video feedback module 412 may provide video feedback to the user (e.g., advertisements, visual information, visual responses, etc.) based on the information.

Figure 5:
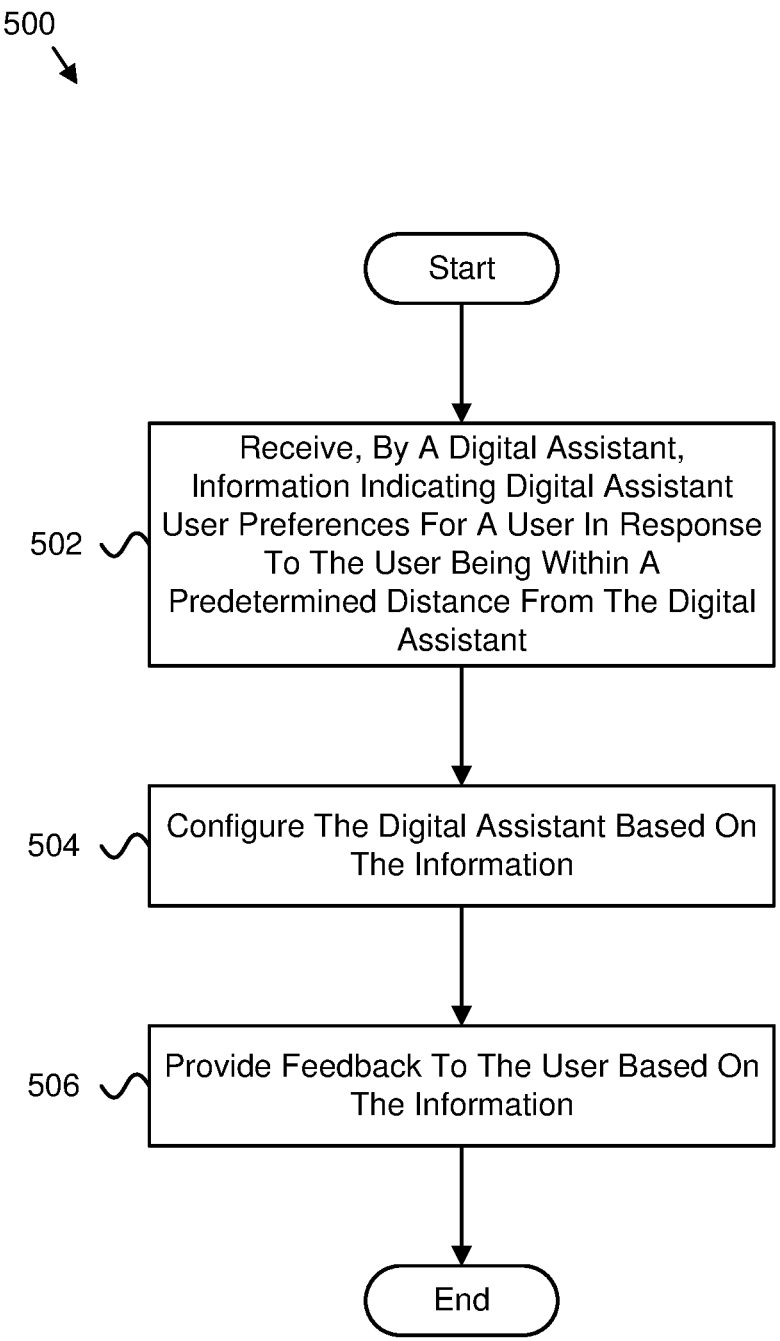
FIG. 5 is a schematic flow chart diagram illustrating an embodiment of a method for digital assistant management.

FIG. 5 is a schematic flow chart diagram illustrating an embodiment of a method 500 for digital assistant management. In some embodiments, the method 500 is performed by an apparatus, such as the information handling device 102. In other embodiments, the method 500 may be performed by a module, such as the digital assistant management module 104. In certain embodiments, the method 500 may be performed by a processor executing program code, for example, a microcontroller, a microprocessor, a CPU, a GPU, an auxiliary processing unit, a FPGA, or the like.

The method 500 may include receiving 502, by use of a processor (e.g., the processor 202), information indicating digital assistant user preferences for a user in response to the user being within a predetermined distance from an information handling device 102 (e.g., a digital assistant). In certain embodiments, the reception module 302 may receive 502 the information indicating the digital assistant user preferences for the user in response to the user being within the predetermined distance from the information handling device 102. In various embodiments, receiving 502 the information includes receiving the information directly from a device carried by the user via a wireless signal. In some embodiments, receiving 502 the information includes receiving the information from a server in response to the server: receiving the information; and determining that the user is within a predetermined distance from the information handling device 102.

In certain embodiments, the digital assistant user preferences include a public profile for the user. In various embodiments, the public profile includes a name the information handling device 102 uses to communicate with the user, a preferred voice gender, voice detection information used to detect whether the user is speaking, music preferences of the user, news preferences of the user, shopping preferences of the user, food preferences of the user, entertainment preferences of the user, and/or sports preferences of the user.

The method 500 may include configuring 504 the information handling device 102 based on the information. In some embodiments, the configuration module 304 may configure 504 the information handling device 102 based on the information.

The method 500 may include providing 506 feedback to the user based on the information, and the method 500 may end. In some embodiments, the feedback module 306 may provide 506 the feedback to the user based on the information. In various embodiments, providing 506 the feedback to the user includes providing audio feedback to the user. In certain embodiments, providing 506 the feedback to the user includes providing video feedback to the user.

In certain embodiments, the method 500 includes receiving audible input from the user. In such embodiments, providing the feedback to the user includes providing the feedback to the user based on the audible input received from the user. In various embodiments, the method 500 includes removing the information from the information handling device 102 in response to the user not being within the predetermined distance from the information handling device 102. In some embodiments, the method 500 includes removing the information from the information handling device 102 after a predetermined period of time elapses.

Figure 6:
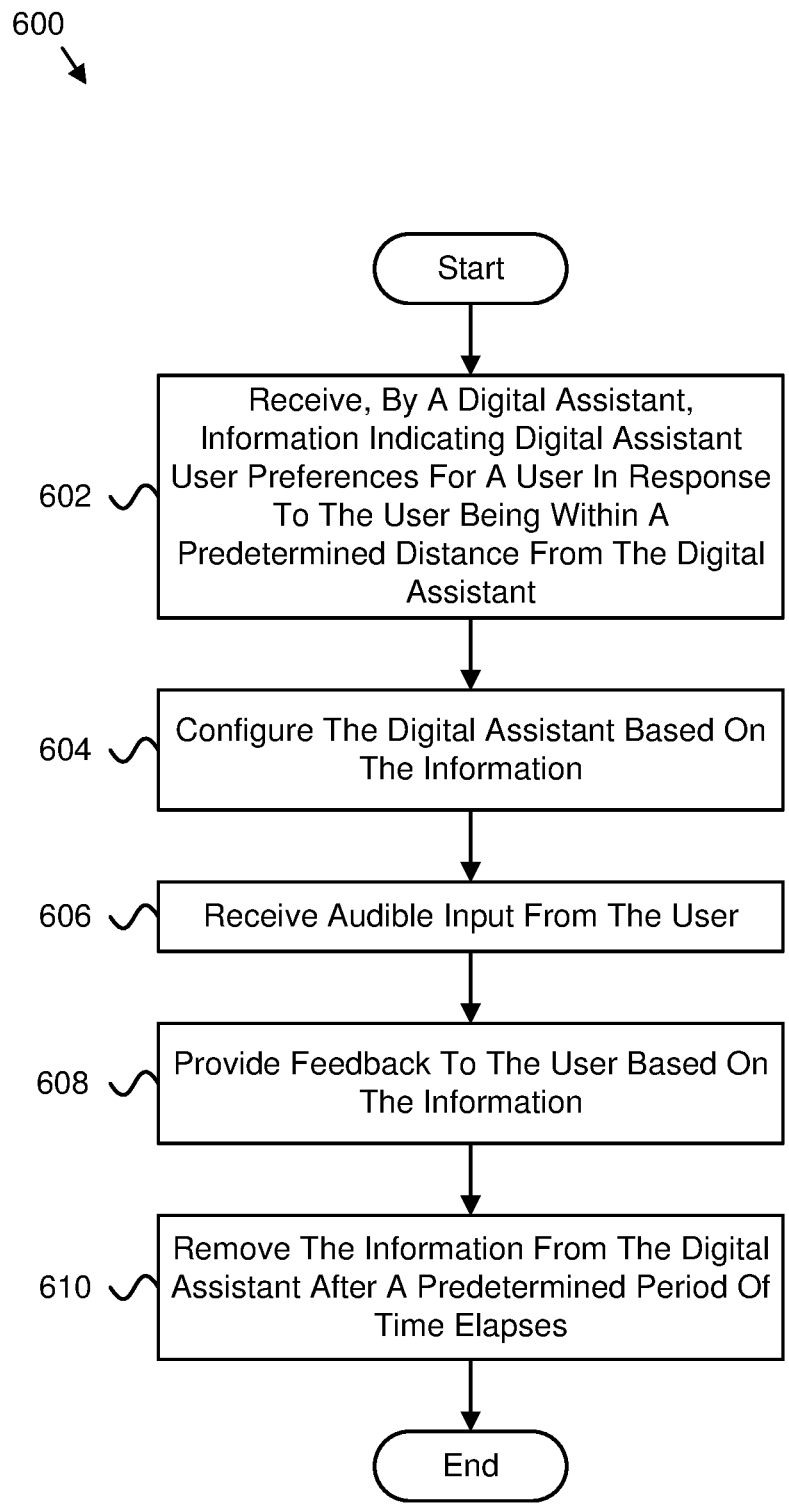
FIG. 6 is a schematic flow chart diagram illustrating another embodiment of a method for digital assistant management.

FIG. 6 is a schematic flow chart diagram illustrating another embodiment of a method 600 for digital assistant management. In some embodiments, the method 600 is performed by an apparatus, such as the information handling device 102. In other embodiments, the method 600 may be performed by a module, such as the digital assistant management module 104. In certain embodiments, the method 600 may be performed by a processor executing program code, for example, a microcontroller, a microprocessor, a CPU, a GPU, an auxiliary processing unit, a FPGA, or the like.

The method 600 may include receiving 602, by use of a processor (e.g., the processor 202), information indicating digital assistant user preferences for a user in response to the user being within a predetermined distance from an information handling device 102 (e.g., a digital assistant). In certain embodiments, the reception module 302 may receive 602 the information indicating the digital assistant user preferences for the user in response to the user being within the predetermined distance from the information handling device 102. In various embodiments, receiving 602 the information includes receiving the information directly from a device carried by the user via a wireless signal. In some embodiments, receiving 602 the information includes receiving the information from a server in response to the server: receiving the information; and determining that the user is within a predetermined distance from the information handling device 102.

In certain embodiments, the digital assistant user preferences include a public profile for the user. In various embodiments, the public profile includes a name the information handling device 102 uses to communicate with the user, a preferred voice gender, voice detection information used to detect whether the user is speaking, music preferences of the user, news preferences of the user, shopping preferences of the user, food preferences of the user, entertainment preferences of the user, and/or sports preferences of the user.

The method 600 may include configuring 604 the information handling device 102 based on the information. In some embodiments, the configuration module 304 may configure 604 the information handling device 102 based on the information.

The method 600 may include receiving 606 audible input from the user. In various embodiments, the input module 406 may receive 606 the audible input from the user.

The method 600 may include providing 608 feedback to the user based on the information. In some embodiments, the feedback module 306 may provide 608 the feedback to the user based on the information. In various embodiments, providing 608 the feedback to the user includes providing audio feedback to the user. In certain embodiments, providing 608 the feedback to the user includes providing video feedback to the user. In some embodiments, providing 608 the feedback to the user includes providing the feedback to the user based on the audible input received from the user.

In some embodiments, the method 600 includes removing 610 the information from the information handling device 102 after a predetermined period of time elapses, and the method 600 may end. In certain embodiments, the removal module 408 may remove 610 the information from the information handling device 102 after the predetermined period of time elapses. In various embodiments, the method 600 includes removing the information from the information handling device 102 in response to the user not being within the predetermined distance from the information handling device 102.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
receive, by use of the processor, information indicating digital assistant user preferences for a plurality of users in response to each user being within a predetermined distance from the apparatus, wherein the digital assistant user preferences for each user comprise a public profile for the user, the public profile for the user does not include any confidential personal information, and the public profile comprises a name the digital assistant uses to communicate with the user, a preferred voice gender, voice detection information used to detect whether the user is speaking, music preferences of the user, news preferences of the user, shopping preferences of the user, food preferences of the user, entertainment preferences of the user, sports preferences of the user, or some combination thereof;
configure the apparatus based on the information;
select a user from the plurality of users, wherein the user is selected from the plurality of users in response to:
the information indicating the digital assistant user preferences for the user being the most recent user information received;
the user having a location closer to the apparatus than other users of the plurality of users;
voice characteristics of audio input received from the user matching the information indicating the digital assistant user preferences for the user;
or some combination thereof;
in response to selecting the user from the plurality of users, provide feedback to the user based on the information indicating digital assistant user preferences for the user.

2. The apparatus of claim 1, wherein the code is executable by the processor to receive the information directly from a device carried by the user via a wireless signal.

3. The apparatus of claim 1, wherein the code is executable by the processor to receive the information from a server in response to the server:
receiving the information; and
determining that the user is within the predetermined distance from the apparatus.

4. A method comprising:
receiving, by a digital assistant, information indicating digital assistant user preferences for a plurality of users in response to each user being within a predetermined distance from the digital assistant, wherein the digital assistant user preferences for each user comprise a public profile for the user, the public profile for the user does not include any confidential personal information, and the public profile comprises a name the digital assistant uses to communicate with the user, a preferred voice gender, voice detection information used to detect whether the user is speaking, music preferences of the user, news preferences of the user, shopping preferences of the user, food preferences of the user, entertainment preferences of the user, sports preferences of the user, or some combination thereof;
configuring the digital assistant based on the information;
selecting a user from the plurality of users, wherein the user is selected from the plurality of users in response to:
the information indicating the digital assistant user preferences for the user being the most recent user information received;
the user having a location closer to the digital assistant than other users of the plurality of users;
voice characteristics of audio input received from the user matching the information indicating the digital assistant user preferences for the user;
or some combination thereof;
in response to selecting the user from the plurality of users, providing feedback to the user based on the information indicating digital assistant user preferences for the user.

5. The method of claim 4, wherein receiving the information comprises receiving the information directly from a device carried by the user via a wireless signal.

6. The method of claim 4, wherein receiving the information comprises receiving the information from a server in response to the server:
receiving the information; and
determining that the user is within the predetermined distance from the digital assistant.

7. The method of claim 4, further comprising removing the information from the digital assistant in response to the user not being within the predetermined distance from the digital assistant.

8. The method of claim 4, further comprising removing the information from the digital assistant after a predetermined period of time elapses.

9. The method of claim 4, wherein providing the feedback to the user comprises providing audio feedback to the user.

10. The method of claim 4, wherein providing the feedback to the user comprises providing video feedback to the user.

11. The method of claim 4, further comprising receiving the audible input from the user.

12. The method of claim 11, wherein providing the feedback to the user comprises providing the feedback to the user based on the audible input received from the user.

13. A program product comprising a computer readable storage medium that stores code executable by a processor, the executable code comprising code to perform:
receiving, by a digital assistant, information indicating digital assistant user preferences for a plurality of users in response to each user being within a predetermined distance from the digital assistant, wherein the digital assistant user preferences for each user comprise a public profile for the user, the public profile for the user does not include any confidential personal information, and the public profile comprises a name the digital assistant uses to communicate with the user, a preferred voice gender, voice detection information used to detect whether the user is speaking, music preferences of the user, news preferences of the user, shopping preferences of the user, food preferences of the user, entertainment preferences of the user, sports preferences of the user, or some combination thereof;

configuring the digital assistant based on the information;

selecting a user from the plurality of users, wherein the user is selected from the plurality of users in response to:
- the information indicating the digital assistant user preferences for the user being the most recent user information received;
- the user having a location closer to the digital assistant than other users of the plurality of users;
- voice characteristics of audio input received from the user matching the information indicating the digital assistant user preferences for the user;
- or some combination thereof;

in response to selecting the user from the plurality of users, providing feedback to the user based on the information indicating digital assistant user preferences for the user.

14. The program product of claim 13, wherein the executable code comprises code to perform removing the information from the digital assistant in response to the user not being within the predetermined distance from the digital assistant.

15. The program product of claim 13, wherein the executable code comprises code to perform removing the information from the digital assistant after a predetermined period of time elapses.

16. The program product of claim 13, wherein providing the feedback to the user comprises providing audio feedback to the user.

* * * * *